US010952140B2

(12) United States Patent
Park (10) Patent No.: US 10,952,140 B2
(45) Date of Patent: Mar. 16, 2021

(54) POWER SAVING METHOD AND DEVICE THEREOF IN INTERNET-OF-THINGS (71) Applicant: FCI INC., Seongnam-si (KR)

(72) Inventor: Chang Hawn Park, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 16/052,662

(22) Filed: Aug. 2, 2018

(65) Prior Publication Data
US 2019/0150086 A1 May 16, 2019

(30) Foreign Application Priority Data
Nov. 13, 2017 (KR) .................. 10-2017-0150676

(51) Int. Cl.
H04W 52/02 (2009.01)
H04L 29/12 (2006.01)
H04W 76/19 (2018.01)

(52) U.S. Cl.
CPC ....... H04W 52/0216 (2013.01); H04L 61/103 (2013.01); H04W 52/0229 (2013.01); H04W 76/19 (2018.02); H04L 61/6009 (2013.01); H04L 61/6022 (2013.01)

(58) Field of Classification Search
CPC ......... H04W 52/0216; H04W 52/0229; H04W 76/19; H04L 61/103; H04L 61/6022; H04L 61/6009
See application file for complete search history.

(56) References Cited

U.S. PATENT DOCUMENTS

| 9,301,325 | B1* | 3/2016 | Sanap | .................. H04W 76/10 |
| 2005/0009512 | A1 | 1/2005 | Rue | |
| 2009/0016251 | A1* | 1/2009 | Adams | .............. H04W 12/0609 370/311 |
| 2010/0304782 | A1* | 12/2010 | Chang | .................. H04W 8/183 455/552.1 |

(Continued)

FOREIGN PATENT DOCUMENTS

CN 103582180 A 2/2014

OTHER PUBLICATIONS

Texas Instruments,"SimpleLinkTM CC3100/CC3200 Wi-Fi Internet-on-a-chipTM Networking Sub-system Power management", Application Report, SWRA462, Sep. 2014.

Primary Examiner — Un C Cho
Assistant Examiner — Yu-Wen Chang
(74) Attorney, Agent, or Firm — Saile Ackerman LLC; Stephen B. Ackerman; Billy Knowles (57) ABSTRACT The power saving method includes storing current connection information of an electronic device corresponding to an access point; disconnecting power supply to designated hardware to form a disconnection state after storing the current connection information; determining whether the disconnection state conforms to a release condition; and connecting the power supply to the designated hardware if the disconnection state conforms to the release condition. The connecting of the power supply to the designated hardware includes loading final connection information of the electronic device corresponding to the access point prior to disconnecting the power supply, and utilizing the final connection information to guide the electronic device to connect the access point.

9 Claims, 5 Drawing Sheets (56) References Cited

U.S. PATENT DOCUMENTS

| | | | | |
|---|---|---|---|---|
| 2010/0304794 | A1* | 12/2010 | Beninghaus | H04W 52/028 |
| | | | | 455/574 |
| 2012/0327849 | A1* | 12/2012 | Lin | H04W 48/20 |
| | | | | 370/328 |
| 2013/0176897 | A1* | 7/2013 | Wang | H04W 48/08 |
| | | | | 370/254 |
| 2014/0247764 | A1* | 9/2014 | Kukosa | H04W 52/0274 |
| | | | | 370/311 |
| 2015/0078229 | A1* | 3/2015 | Choi | H04W 56/001 |
| | | | | 370/311 |
| 2015/0282079 | A1* | 10/2015 | Alon | H04W 52/0216 |
| | | | | 370/311 |
| 2017/0070958 | A1* | 3/2017 | Sampath | H04W 52/0229 |
| 2018/0375729 | A1* | 12/2018 | Tzoreff | H04L 41/0856 |

* cited by examiner

POWER SAVING METHOD AND DEVICE THEREOF IN INTERNET-OF-THINGS

RELATED APPLICATIONS

This application claims priority benefit of Korean Patent Application No. 10-2017-0150676 filed Nov. 13, 2017, of which is hereby incorporated by reference in its entirety.

BACKGROUND OF INVENTION

1. Field of Invention

The present invention relates to a power saving method for an electronic device with a communication function, for example, such as a power saving method for Internet of Things devices.

2. Related Art

Figure 1:
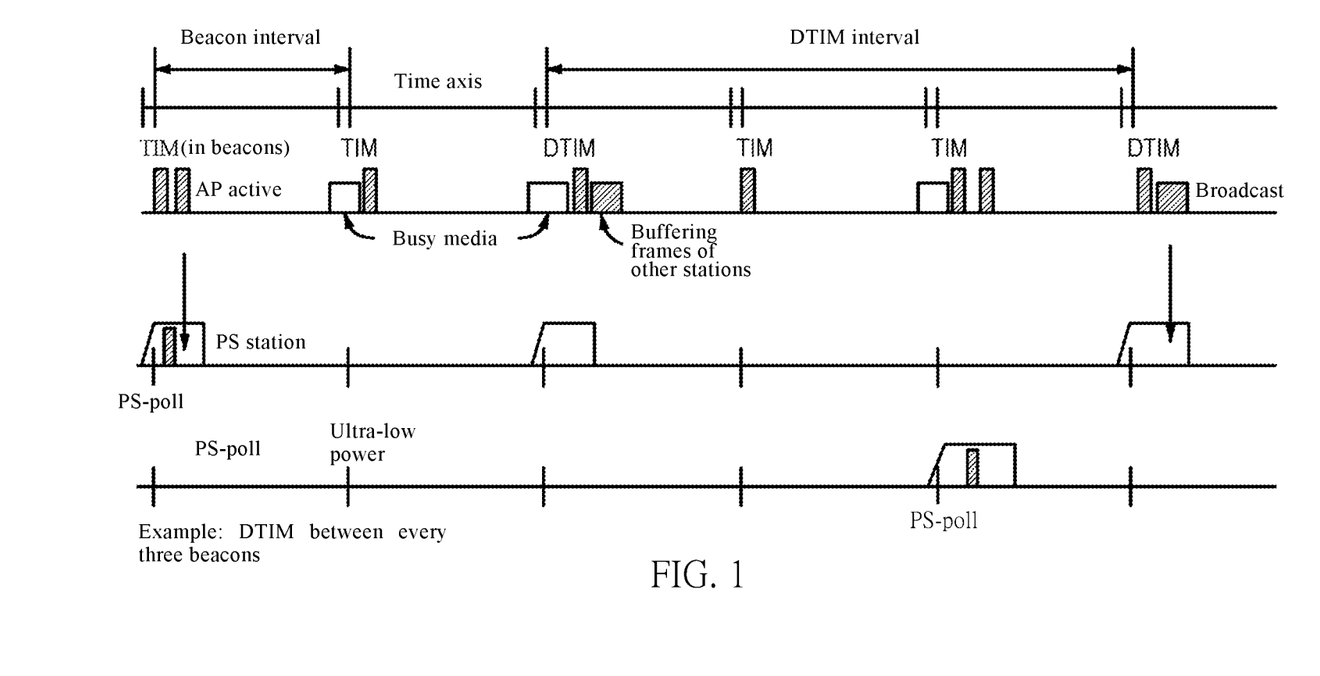
FIG. 1 shows a conventional power management method for electronic devices with wireless network function defined in an institute of electrical and electronics engineers (IEEE) 802.11 standards.

The following descriptions do not constitute related art and provides only background information related to embodiments of the present invention. FIG. 1 shows a conventional power management method for electronic devices with a wireless network function defined in the Institute of Electrical and Electronics Engineers (IEEE) 802.11 standards.

Conventional electronic devices with a wireless network function enter in a power saving mode in an active mode where there is no data to be received. In the power saving mode, check traffic indication message (TIM) or delivery traffic indication message (DTIM), functioning as data of beacon frames, to determine whether there is data to be received, according to beacon frames transmitted from access points during a fixed period. If a checking result indicates that there is data to be received, the power saving mode is changed to an active mode transmitting power save-poll (PS-Poll) and receiving data. If the check result indicates that there is no data to be received, the power saving mode remains the same.

Devices for performing wireless communication with access points are configured to set a timer of a real-time clock in the TIM or DTIM reception interval in order to receive the beacon frame, and then are changed to a power saving mode. The TIM or DTIM is checked, and if there is data to be received, the device is changed to an active mode and transmits the PS-polling and receives the data.

Recently, a lot of devices are developed for Internet of Things (Iot). IoT devices are required to be capable of communicating for years by installing a primary battery. Therefore, lower power feature is very important to IoT devices.

Relating to the above-mentioned technical filed, Korean patent publication no. 10-2012-0109127, published Oct. 8, 2012, discloses a method and device for reducing power consumption of wireless network devices. The method is a search period setting method for reducing power consumption of wireless network devices. Such method is provided to change the search period of communication modules of wireless network devices according to a user's visual setting, so as to avoid consuming power excessively. However, Korean patent publication no. 10-2012-0109127 merely discloses one method for reducing power consumption through a user's visual setting of the searching period of AP of wireless network devices, but does not disclose a method of minimizing power consumption in a state when an electronic device is connected with an AP.

SUMMARY OF INVENTION

An object of the present invention is to provide a power saving method of an electronic device in Internet-of-Things. The power saving method is capable of disconnecting power supply to as many hardware resources as possible to minimize power consumption in a power saving mode, and to minimize time spent connecting an electronic device with an access point after connection of the power supply to the hardware resources when the power saving mode converts into an active mode.

To achieve the above-mentioned object, a power saving method of an electronic device in Internet-of-Things of the present invention comprises: storing current connection information of the electronic device corresponding to an access point; disconnecting power supply from the access point to designated hardware to form a disconnection state after storing the current connection information; determining whether the disconnection state conforms to a release condition; and connecting the power supply for the designated hardware if the disconnection state conforms to the release condition; wherein the connecting of the power supply for the designated hardware comprises: loading final connection information of the electronic device corresponding to the access point prior to disconnecting the power supply, and utilizing the final connection information to guide the electronic device to connect the access point.

The present invention further provides an electronic device, comprising a communication unit for performing communication with an access point; a memory unit storing connection information for connecting an access point; a first control portion, after the electronic device performs a power saving mode, storing current connection information of the electronic device corresponding to the access point, and then disconnecting power supply from to designated hardware to form a disconnection state, the designated hardware including the first control portion; a second control portion, which is not included in the designated hardware; and when the disconnection state conforms to a release condition, the second control portion connects the power supply for the designated hardware, and the first control portion loads final connection information of the electronic device corresponding to the access point prior to disconnecting the power supply, and utilizes the final connection information to guide the electronic device to connect the access point.

Power management of the electronic device with a communication function of the present invention is as follows: the power management is capable of disconnecting power supply to as many hardware resources as possible to minimize power consumption in a power saving mode, and to minimize time spent connecting the electronic device with an access point after connection of the power supply when the power saving mode converts into the active mode.

DESCRIPTION OF PREFERRED EMBODIMENTS

Hereafter, embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. In the entire specification of the present application, when it is described that a certain unit "includes" or "comprises" a certain element, this means that the unit may include any other element rather than exclude the any other element unless otherwise described. The terms "unit", "module" and the like used in the specification refer to units processing at least one function or operation and may be implemented by hardware, software, or a combination thereof.

An electronic device of the present invention is referred to all kinds of electronic devices communicating with an access point (AP). A communication method of the electronic device of the present invention is capable of being performed not only through wireless communication, but also through closed type networks, such as local area network (LAN) or wide area network (WAN), or through open type networks, such as Internet, or through mobile communication networks, such as code division multiple access (CDMA), wideband code division multiple access (WCDMA), global system for mobile communication (GSM), or long term evolution (LTE), and all communication methods that are applicable currently or can be realized in the future.

Hereinafter, in the description of the present invention, an electronic device that communicates with an access point is referred to as station (STA) for short, and a communication method is illustrated by taking wireless network communication as an example.

A conventional STA disconnects radio frequency (RF) by maintaining connecting with an AP in a power saving mode, thereby to achieve power saving. However, recently, Internet of Things devices are required to operate with ultra-low power, and therefore cause the STA to operate in a manner as follows: in order to minimize power consumption, the STA simply disconnects not only the RF, but also as many hardware resources as possible including a central processing unit.

Figure 2A:
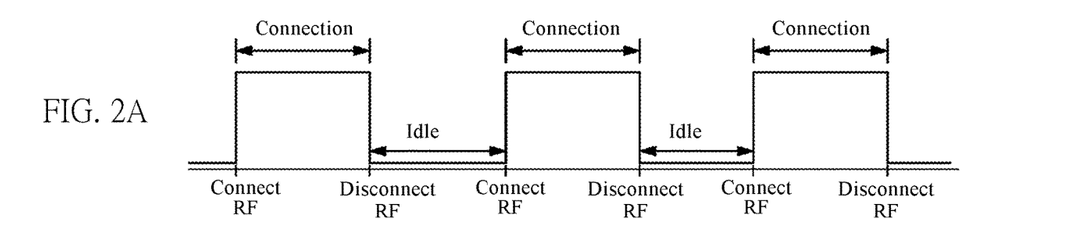
FIG. 2A shows a traditional power saving method of a station (STA).
Figure 2B:
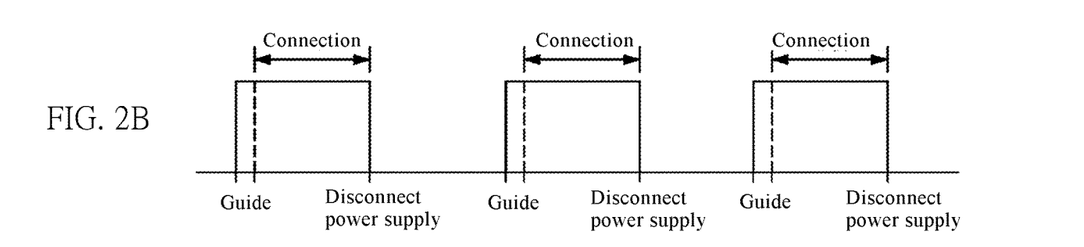
FIG. 2B shows a traditional power saving method of a STA.
Figure 2C:
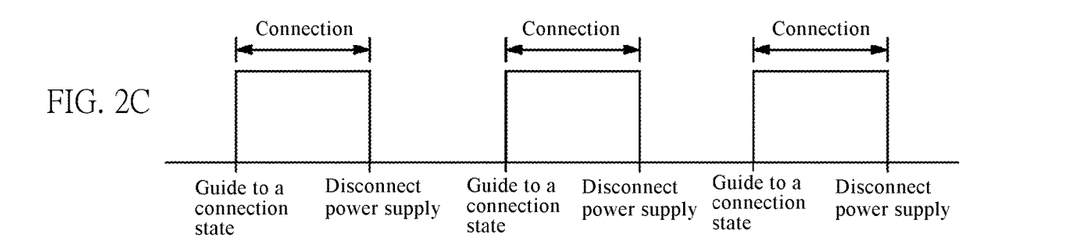
FIG. 2C shows a power saving method of a STA of the present invention.

FIG. 2A and FIG. 2B both show a traditional power saving method of a STA, and FIG. 2C shows a power saving method of a STA of the present invention.

FIG. 2A shows a method of a STA saving power by maintaining connecting with an AP in a power saving mode and disconnecting only RF. As shown in FIG. 2A, a small amount of power consumption is also generated when only disconnecting RF in a power saving mode.

FIG. 2B shows a method of maximally disconnecting power supply of hardware resources of a STA including a central processing unit (CPU) in a power saving mode. As shown in FIG. 2B, in a condition of maximally disconnecting power supply in the power saving mode, the power saving method consumes less power in comparison with the power saving method as shown in FIG. 2A, but causes a delay until the hardware resources is connected with an AP when the power saving mode converts into an active mode.

FIG. 2C shows a power saving method of an embodiment of the present invention. In a power saving mode, the method is utilized to disconnect as many hardware resources as possible including a central processing unit to minimize power consumption. Specifically, when the power saving mode is changed to an active mode to connect power supply to hardware resources of which power supply is disconnected, a STA is guided to connect an AP. Unlike the method as shown in FIG. 2B, the power saving method of the embodiment of the present invention not only minimizes power consumption, but also reduces the delay generated until the hardware resources connected with an AP. In this manner, the STA is capable of being activated to immediately communicate with the AP without additional connecting processes.

Figure 3:
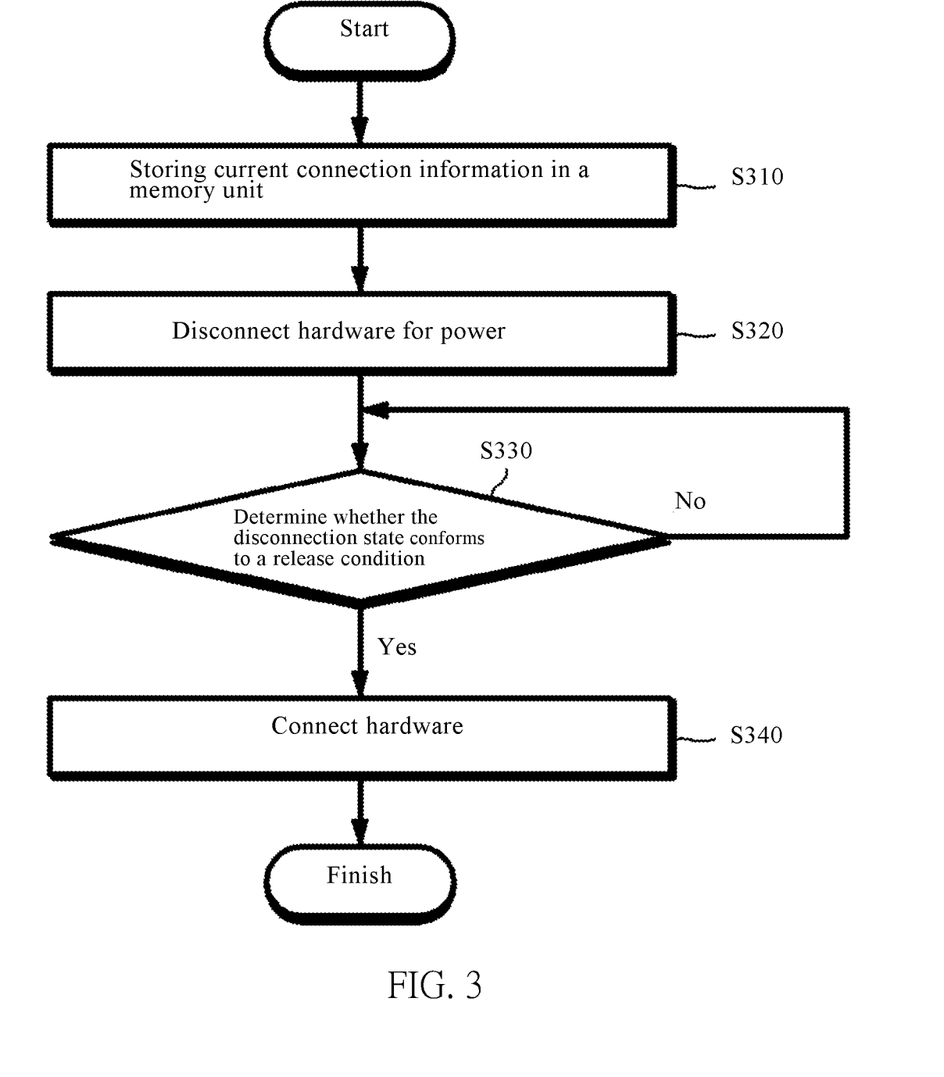
FIG. 3 is a flowchart of a power saving method in accordance with an embodiment of the present invention.

FIG. 3 is a flowchart of a power saving method in accordance with an embodiment of the present invention.

The power saving method in accordance with an embodiment of the present invention comprises storing current connection information of the electronic device corresponding to an access point (S310); disconnecting power supply from the access point to designated hardware to form a disconnection state (S320); determining whether the disconnection state conforms to a release condition (S330); and connecting the power supply to the designated hardware (S340) if the disconnection state conforms to the release condition (yes in S330).

Storing current connection information of the electronic device corresponding to an access point (S310) is to store connection information for communication between an AP and a STA in the STA. Timing of storing connection information can take place when the STA is initially connected to the AP, or prior to the STA converting into a power saving mode. Also, the timing can take place at each time when a connection state of the STA and AP is changed and generating events, thereby to store the changed connection information. At this time, the connection information is stored in a nonvolatile memory, so that the connection information can be maintained even is the power supply is disconnected.

All execution information is disappeared because major hardware including a central processing unit is closed if power supply of designated hardware is disconnected in a power saving mode. However, if connection information stored in a memory is utilized, a wireless network is capable of being guided into a connection state without going through wireless network connecting processes when being guided.

The connection information comprises basic connection information, advanced connection information, basic communication information, and advanced communication information.

The basic connection information comprises frequency, channel width, basic service set identifier (BSSID), quality of service (QoS), high throughput (HT) capability information, and capability information. A data structure of the frequency can be non-symbol short integer type (unsigned short), and A data structure of BSSID can be non-symbol character type (unsigned char).

The advanced connection information comprises key information. The key information comprises a conversation encryption key for encrypted conversation in wireless areas, that is, pairwise transient key (PTK) information and group temporal key (GTK) information.

The basic communication information comprises Internet protocol (IP) address, netmask, gateway, and domain name system (DNS).

Advanced communication information comprises null sequence number, data sequence number, and encoding information vector number.

The disconnecting of power to designated hardware to form the disconnection state (S320) is performed to disconnect power supply to as many hardware resources as possible including a CPU in a power saving mode, thereby to minimize power consumption.

The power supply of a part of hardware resources including a real time clock (RTC) timer is not disconnected in the power saving mode. A small program which is already installed in a station periodically receives beacon frames from an AP through the RTC timer and stops operation after completing self service of transmission of a gratuitous address resolution protocol (GARP) packet or an address resolution protocol (ARP) packet as logged.

By reading traffic indication message (TIM) and delivery traffic indication message (DTIM) elements of the beacon frame sent from the AP, the small program determines whether there is data buffered in the AP for transmission to the STA. In the case of containing the buffering data, the STA is changed to an active mode.

Figure 4:
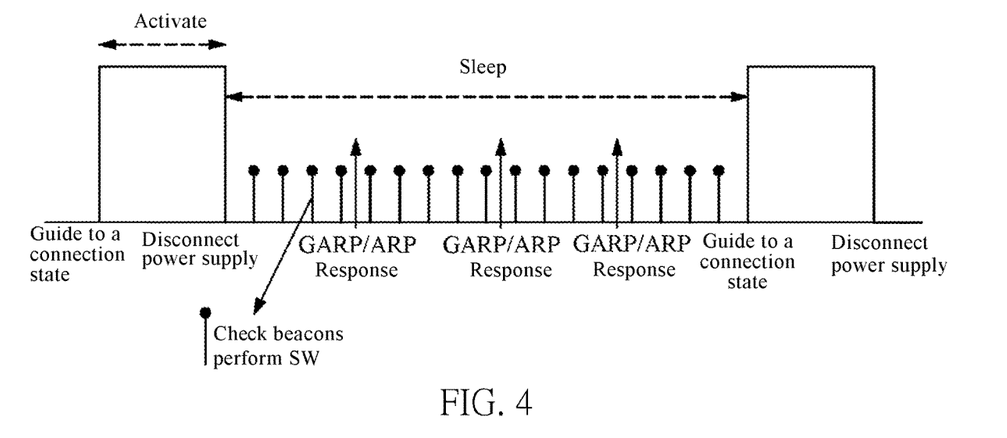
FIG. 4 is a table illustrating a process of a STA periodically transmitting gratuitous address resolution protocol (GARP) packets or address resolution protocol (ARP) packets to update access points.

As shown in FIG. 4, the small program is capable of periodically transmitting a GARP packet or an ARP packet for updating an ARP table of the AP, so as to constantly update the ARP table of the AP. If the ARP table of the AP is newly updated, even communication packets flowing into outside can be immediately obtained a media access control (MAC) address, and therefore communication can be realized without additional transmission of ARP data.

The small program updates serial number of headers of packets stored and transmitted in a power saving mode for rapidly carrying out communication when converting into an active mode. The small program is capable of rapidly carrying out communication by immediately utilizing the serial number of the headers of the packets being transmitted when the power saving mode converts into the active mode to connect power supply to the hardware.

The determining whether the disconnection state conforms to a release condition (S330) is to determine whether the power saving mode needs to be changed to the active mode.

In the power saving mode, the small program periodically receives beacon frames sent from the AP also through the RTC timer. At this time, by reading TIM and DTIM elements of the beacon frame sent from the AP, the small program determines whether there is data buffered in the AP for transmission to the STA.

Based on the TIM or DTIM elements of the beacon frame, the AP is capable of informing whether there are data frames to be transmitted to each STA. Usually, the TIM is utilized to inform the presence of a unicast frame to be transmitted to the STA, and the DTIM is utilized to inform the presence of multicast frames or broadcast frames to be transmitted the STA. For instance, the TIM element can represent pending downlink data that is transmitted to the STA based on unicast. The DTIM can represent pending downlink data that is transmitted to the STA based on broadcast or multicast.

On the other hand, listen intervals are set in the STA. In this manner, the STA is forcibly changed to the active mode with the listen intervals as a unit to receive data frames from the AP. That is, the STA is forcefully changed to the active mode after a predetermined period of disconnection of power supply.

For instance, if a listen interval is 7, the STA is forcibly changed to the active mode to receive data frames by taking a period of seven times a beacon interval as a unit. However, because of restrictions on the buffer size, each of the APs often processes the packets without considering the listen interval of the STA. The restrictions on the buffer size also have adverse influence on performance. Therefore, whether the power saving mode is changed to the active mode is usually determined by the TIM and DTIM.

In the power saving mode, if the disconnection state conforms to the release condition (yes in S330), the connecting the power supply to the designated hardware (S340) comprises loading final connection information prior to disconnecting the power supply, and utilizing the final connection information to guide the STA to connect the AP.

The loading final connection information prior to disconnecting the power supply is performed when the STA is initially connected to the AP, or prior to the STA converting into the power saving mode, loading connection information finally stored in nonvolatile memory. If connection information stored in the nonvolatile memory is utilized, during the process of re-guiding the STA and connecting the power supply which was disconnected, a wireless network is capable of being guided to a connection state without going through wireless network connecting processes.

The utilizing the final connection information to guide the STA to connect the AP comprises initializing a wireless network related data structure, and utilizing the final connection information to set a wireless network connection related structure and a network stack.

The initializing a wireless network related data structure is to initialize the wireless network related data structure including a storage pool, a WIFI control resource, and a WIFI control structure. The WIFI control resource includes a wireless network control thread (i.e., WIFI control thread), and the WIFI control structure includes the WIFI connection structure and a network structure.

The utilizing the final connection information to set a wireless network connection related structure and network stack comprises: after initializing the wireless network related data structure, utilizing the final connection information to set the wireless network connection related structure and the network stack in the storage pool which is initialized and the wireless network control thread which is initialized, thereby to guide the STA to connect the AP.

When connecting the power supply of the main CPU disconnected in the power saving mode, and driving to guide software to process wireless network communication with an operating system (OS), a kernel, a device driver, WIFI MAC, transmission control protocol (TCP)/IP stack, a supplicant, and a user application, utilizing the final connection information to set the wireless network connection related structure and the network stack, thereby a wireless network is capable of being automatically set as a connection state without going through wireless network connecting processes, and enabling an immediate communication with the AP.

Figure 5:
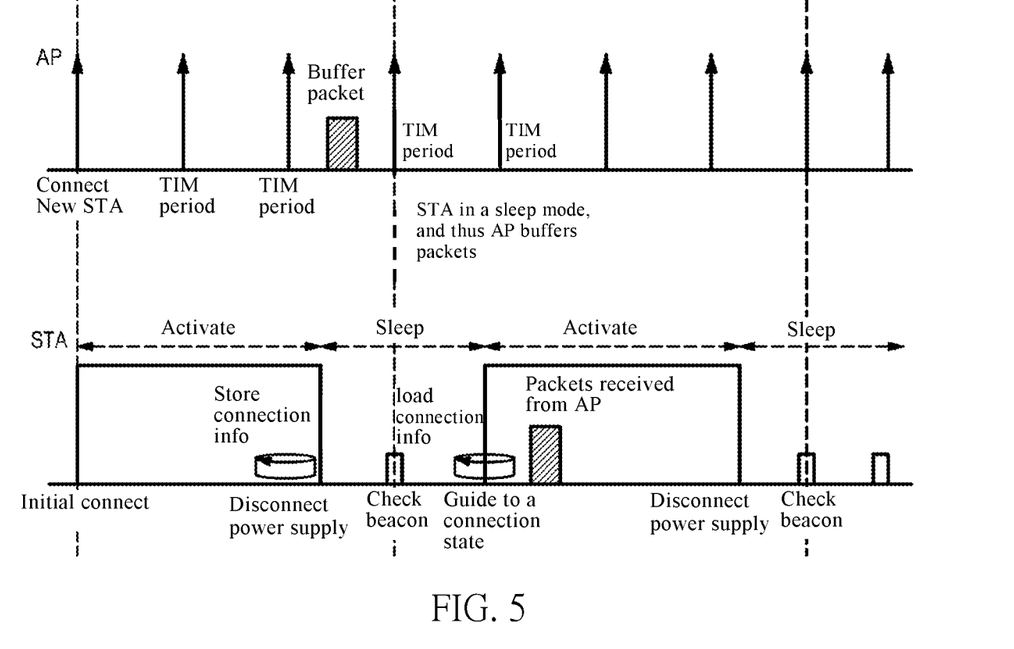
FIG. 5 shows a process of the power saving method performed on an AP and a STA in accordance with an embodiment of the present invention.

FIG. 5 shows a process of the power saving method performed on an AP and a STA in accordance with an embodiment of the present invention.

The STA stores current connection information in the power saving mode, then power supply to designated hardware is disconnected.

The AP transmits beacon frames including TIM elements over a TIM period as a unit, or transmits beacon frames including DTIM elements over a DTIM period as a unit. As shown in FIG. 5, an example is illustrated that the AP transmits beacon fames including TIM elements over a TIM period as a unit.

A packet to be transmitted to the STA is generated between the second TIM period and the third TIM period of the AP. The AP buffers the packet for transmission to the STA.

The AP enables the beacon frame transmitted at the third TIM period to comprise a TIM element indicating that a packet to be transmitted to the STA is contained in the beacon frame, and the STA converts into the active mode upon receiving the beacon frame.

After the power supply of the hardware being disconnected is connected and the final connection information is loaded, the STA utilizes the final connection information to connect the AP. The STA is capable of communicating with the AP during the time of being guided, and therefore the STA is capable of immediately receiving packets from the AP.

Figure 6:
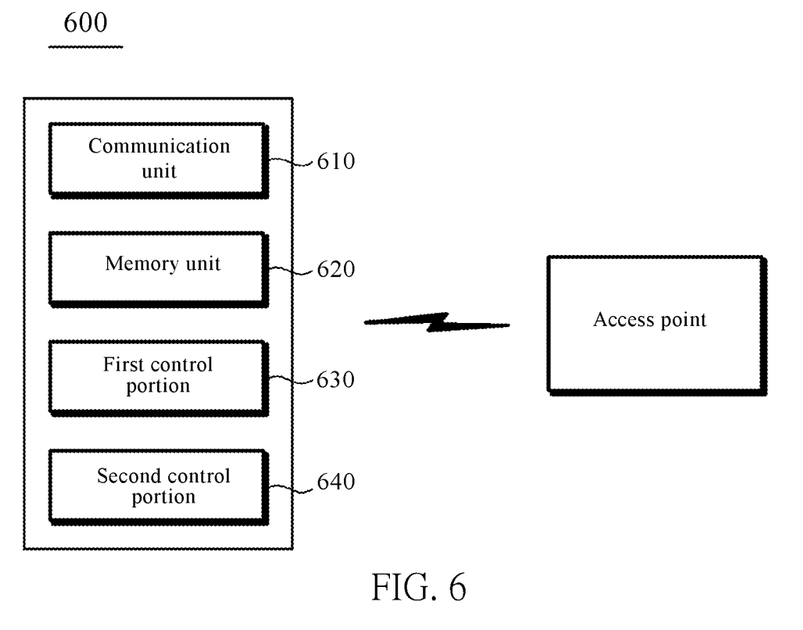
FIG. 6 is a schematic block diagram showing an electronic device of the power saving method in accordance with an embodiment of the present invention.

FIG. 6 is a schematic block diagram showing an electronic device of the power saving method in accordance with an embodiment of the present invention. The electronic device 600 (STA) of the present invention comprises a communication unit 610, a memory unit 620, a first control portion 630, and a second control portion 640. The communication unit performs communication with the AP. The memory unit is a nonvolatile memory storing connection information of the AP and the STA.

When the power saving mode is carried out, the first control portion 630 stores current connection information of the STA corresponding to the AP in the memory unit 620, and then disconnects power supply to designated hardware including the first control portion 630 to form a disconnection state. Namely, the first control portion 630 is disconnected in the power saving mode.

On the other hand, if connection information stored in the memory unit 620 is failed to be retrieved, that is, no connection information stored in the memory is retrieved, or the connection information being retrieved is not identical to the current connection information, the first control portion 630 stores the current connection information in the memory unit 620.

The second control portion 640 is not included in the designated hardware being disconnected and is still in operation in the power saving mode. When the disconnection state conforms to a release condition, the second control portion 640 connects the power supply to the designated hardware.

On the other hand, the second control portion 640 periodically operate to receive beacon frames sent from the AP through the RTC timer. The second control portion 640 is capable of determining that the disconnection state conforms to the release condition if a condition indicating that a data frame which is to be transmitted from the AP to the electronic device is contained in the TIM or DTIM information of the beacon frame received from the AP, or a condition indicating that a predetermined period of the disconnection state passes.

On the other hand, the second control portion 640 through the communication unit 610 is capable of periodically transmitting a GARP packet or an ARP packet of an ARP table for updating the AP in the power saving mode.

If the STA is connected by the second control portion 640, the first control portion 630 loads the final connection information prior to the disconnection of power supply and then utilizes the final connection information to guide the STA to connect the AP. The first control portion 630 initializes the storage pool including the memory unit 620 and the WIFI control thread of the wireless network related data structure, and utilizes the final connection information to set a wireless network connection related structure and a network stack in the storage pool and wireless network control thread so initialized.

Other detailed description same as described above is omitted in the embodiment as shown in FIG. 6.

In the above-mentioned embodiments, FIG. 3 shows a flowchart of the power saving method of which S310 to S340 are performed in order. The execution of S310 to S340 is not limited to an order of time sequence. Those skilled in the art would recognize that there exist several alternate sequences of S310 to S340 which can be utilized, or at least one of S310 to S340 can be omitted.

Furthermore, the power saving method as described in the above-mentioned embodiments is recorded in a computer or smart mobile phone and is implemented by coding and readable by the computer and smart mobile phone. A recording medium readable by computer or smart mobile phones includes all kinds of recoding apparatus readable by computer. That is, a recording medium readable by computer or smart mobile phones includes read only memory (ROM), floppy disks, hard disks, compact disc-read only memory, CD-ROM, digital versatile disc (DVD), flash memory, such as, universal serial bus (USB), and solid-state drive (SSD). Furthermore, the power saving method of the present invention is capable of being distributed by computer system over network to separately store codes readable by computers or smart mobile phones.

It is understood that the invention may be embodied in other forms within the scope of the claims. Thus the present examples and embodiments are to be considered in all respects as illustrative, and not restrictive, of the invention defined by the claims.

What is claimed is:

1. A power saving method of an Internet-of-Things electronic device, comprising:
    storing in a nonvolatile memory connection information of the electronic device corresponding to an access point which is currently connected to the electronic device in an active mode;
    in a power saving mode,
    disconnecting a power supply from designated hardware including a main CPU while maintaining power of a real time clock timer to form a disconnection state;
    determining whether the disconnection state conforms to a release condition; and switching the power saving mode to the active mode if the disconnection state conforms to the release condition;
wherein switching the power saving mode to the active mode, comprises:
connecting the power supply to the designated hardware including the main CPU;
utilizing the connection information stored in the nonvolatile memory to guide the electronic device to connect the access point;
wherein the main CPU does not perform wireless network connecting processes with the access point when switching the power saving mode to the active mode; and
wherein the release condition comprises a condition of indicating a service indication message for a beacon frame received from the access point, or a condition of sending a service indication message containing a data frame which is to be transmitted from the assess point to the electronic device, or a condition of passing a predetermined period of the disconnection state.

2. The power saving method of claim 1, wherein the connection information comprises frequency, channel width, basic service set identifier, quality of service, and high throughput capability information of the electronic device.

3. The power saving method of claim 1, wherein the electronic device is guided to connect the access point by initializing a wireless network related data structure including a storage pool and a wireless network control thread by the main CPU, and utilizing the connection information with the access point to set a wireless network connection related structure and network stack in the storage pool which is initialized and the wireless network control thread which is initialized by the main CPU.

4. The power saving method of claim 1, wherein, in the power saving mode, the method further comprises periodically transmitting a gratuitous address resolution protocol (GARP) packet or an address resolution protocol (ARP) packet for updating an address resolution protocol table of the access point.

5. The power saving method of claim 4, wherein the method further comprises storing header information of the packet being transmitted after transmitting the gratuitous ARP packet or the ARP packet.

6. An electronic device, comprises:
a communication unit for performing communication with an access point;
a nonvolatile memory unit;
a first control portion, after the electronic device performs a power saving mode, storing in the nonvolatile memory unit connection information of the electronic device corresponding to the access point which is currently connected to the electronic device, and then disconnecting a power supply from designated hardware to form a disconnection state, the designated hardware including the first control portion;
a second control portion, which is not included in the designated hardware;
when the disconnection state conforms to a release condition, the second control portion connects the power supply to the designated hardware, and the first control portion utilizes the connection information stored in the nonvolatile memory to guide the electronic device to connect the access point without wireless network connecting processes with the access point;
wherein the first control portion includes a main CPU; and
wherein the release condition comprises a condition of indicating a service indication message for a beacon frame received from the access point, or a condition of sending a service indication message containing a data frame which is to be transmitted from the assess point to the electronic device, or a condition of passing a predetermined period of the disconnection state.

7. The electronic device of claim 6, wherein the first control portion initializes a wireless network related data structure including a storage pool and a wireless network control thread, and utilizes the connection information with the access point to set a wireless network connection related structure and network stack initialized storage pool and wireless network control thread.

8. The electronic device of claim 6, wherein, in the disconnection state, the second control portion periodically transmits a gratuitous address resolution protocol (ARP) packet or an address resolution protocol (ARP) packet through the communication unit for updating an address resolution protocol table of the access point.

9. A non-transitory machine readable information storage medium configured for retaining program code recorded upon the non-transitory machine readable information storage medium that when retrieved, decoded, and executed on a computer system performs the method according to claim 1.

* * * * *